(12) United States Patent
Lin

(10) Patent No.: US 8,674,250 B2
(45) Date of Patent: Mar. 18, 2014

(54) SUBSTRATE OF TOUCH PANEL IN MANUFACTURING AND THE METHOD FOR FORMING THE SAME

(75) Inventor: Teh-Zheng Lin, Taoyuan (TW)

(73) Assignee: Young Fast Optoelectronics Co., Ltd, Kuan Yin, Taoyuan (TW)

( * ) Notice: Subject to any disclaimer, the term of this patent is extended or adjusted under 35 U.S.C. 154(b) by 543 days.

(21) Appl. No.: 13/011,938

(22) Filed: Jan. 24, 2011

(65) Prior Publication Data

US 2012/0186855 A1     Jul. 26, 2012

(51) Int. Cl.
*H03K 17/975* (2006.01)

(52) U.S. Cl.
USPC ........................................ 200/600

(58) Field of Classification Search
USPC ........... 200/600, 310–317, 46, 292, 511–512, 200/514; 29/846; 174/250; 345/173–174
See application file for complete search history.

(56) References Cited

U.S. PATENT DOCUMENTS

| | | | | |
|---|---|---|---|---|
| 8,119,937 B2* | 2/2012 | Yang | ............................ | 178/18.06 |
| 8,269,118 B2* | 9/2012 | Kuo et al. | ................... | 178/18.06 |
| 2012/0062509 A1* | 3/2012 | Hsu | ................................ | 345/174 |
| 2012/0075218 A1* | 3/2012 | Lin et al. | ........................ | 345/173 |

* cited by examiner

*Primary Examiner* — Edwin A. Leon

(57) ABSTRACT

A substrate is formed with a plurality of identical positioning indications which cause the coordinate on the upper or lower surfaces of the substrate are identical; the identical positioning indications is selected from one of a plurality of holes formed on an area out of the touch sensing area of the touch panel; a plurality of gaps at edges of the substrate and vertical to the upper or lower main surface of the substrate; positioning indications formed by engraving of laser; and a pair of positioning indications on the upper and lower main surface of the substrate and positioned along a same line vertical to the upper or lower main surface of the substrate; and a combination of above mentioned ways; after manufacturing process, the positioning indications can be removed or not removed. A method for forming the same is also included.

12 Claims, 5 Drawing Sheets

SUBSTRATE OF TOUCH PANEL IN MANUFACTURING AND THE METHOD FOR FORMING THE SAME

FIELD OF THE INVENTION

The present invention relates to manufacturing process of touch panels, in particular to a substrate of a touch panel in manufacturing process which is suitable in manufacturing of any two surfaces of the substrate of a touch panel so as to improve the alignment of the sensing circuits in the touch panel and improve the optical properties of the to panel. A method for forming the same is also included in the present invention.

BACKGROUND OF THE INVENTION

Touch panels usually includes multiple layers stacking together. Layers of electrode, circuit, and other function are formed to two substrates respectively, and the two substrates are attached together by a gluing layer of transparent optical glue. Referring to FIG. 12, a lower substrate 820 is attached to an electrode layer 850 of an upper substrate 840 by a gluing layer 810, and a cover lens 870 and other functional layers are attached to the upper substrate 840 by a gluing layer 860. A protection layer 880 is attached to the electrode layer 830 of the lower substrate 820. Referring to FIG. 13, an electrode layer 850 of an upper substrate 840 is attached to an electrode layer 830 of a lower substrate 820 by a gluing layer 810, and a cover lens 870 with other functional layers are attached to the upper substrate 840 by a gluing layer 860. Such processes of mass production are complicated and bad alignment could be happened to attachment of the upper and lower electrode layers 850 and 830 which might cause wrong sensing signal and damage to appearance and optical characteristic. Distortion of image could happen because of uneven refraction of lights.

SUMMARY OF THE INVENTION

The object of the present invention is to provide a substrate of a touch panel in manufacturing process in that positioning indications are formed for the alignment of the upper and lower main surfaces of the substrate precisely in the manufacturing process so as to increase the alignment and coupling of the upper and lower electrode layers and the adhering precision in the stacking of the various layers of the touch panel. Thus the yield ratio of the product is increased and the optical properties of the panel are enhanced. A method for forming the same is also included in the present invention.

To achieve above object, the present invention provides a substrate of a touch panel in manufacturing process; an upper sensing electrode layer, upper signal conducting layer, and an upper protection layer being formed upon an upper surface of the substrate in order; a lower sensing electrode layer, a lower signal conducting layer, and a lower protection layer being formed to a lower surface of the substrate in order; X axis sensing traces and Y axis sensing traces are formed to the upper and lower sensing electrode layers respectively; the signal conducting wires of the signal conducting layers being connected to the sensing electrode layers; the upper protection layers being formed above the upper sensing electrode layers and the upper signal conducting layer so as to protect the layers from being damaged, and the lower protection layers being formed above the sensing electrode layers and the signal conducting layer so as to protect the layers from being damaged; characteristic in that: in manufacturing process, the substrate is formed with a plurality of identical positioning indications which causes the coordinate on the upper or lower surfaces of the substrate are identical; the identical positioning indications is selected from one of a plurality of holes formed on an area out of the touch sensing area of the touch panel; a plurality of gaps at edges of the substrate and vertical to the upper or lower main surface of the substrate; positioning indications formed by engraving of laser; and a pair of positioning indications on the upper and lower main surface of the substrate and positioned along a same line vertical to the upper or lower main surface of the substrate; and a combination of above mentioned ways. Thus the upper and lower main surface can be formed with sensing electrode layers, signal conduction layers, insulation layers, gluing layers, protection layers, I-CON layers, cover lens, anti-fingerprint layers, atomized thin film, hard coating layers, polarizing film, phase difference thin film or liquid crystal display module or the combination thereof, or a part or whole part thereof. after manufacturing process, the positioning indications can be removed or not removed.

Moreover, the present invention provides a method for manufacturing a substrate of a touch panel, an upper sensing electrode layer, an upper signal conducting layer, and an upper protection layer being formed upon an upper surface of the substrate in order; a lower sensing electrode layer, a lower signal conducting layer, and a lower protection layer being formed to a lower surface of the substrate in order; X axis sensing traces and Y axis sensing traces being formed to the upper and lower sensing electrode layers respectively; the signal conducting wires of the signal conducting layers being connected to the sensing electrode layers; the upper protection layers being formed above the upper sensing electrode layers and the upper signal conducting layer so as to protect the layers from being damaged, and the lower protection layers being formed above the sensing electrode layers and the signal conducting layer so as to protect the layers from being damaged; characteristic in that: in manufacturing process, the substrate is formed with a plurality of identical positioning indications which cause the coordinate on the upper or lower surfaces of the substrate are identical; the identical positioning indications is selected from one of a plurality of holes formed on an area out of the touch sensing area of the touch panel; a plurality of gaps at edges of the substrate and vertical to the upper or lower main surface of the substrate; positioning indications formed by engraving of laser; and a pair of positioning indications on the upper and lower main surface of the substrate and positioned along a same line vertical to the upper or lower main surface of the substrate; and a combination of above mentioned ways; after manufacturing process, the positioning indications can be removed or not removed.

In the method, the substrate is a transparent thin film or multiple layers of transparent thin firm which are glued together.

In the method, a plurality of thin film are formed of identical or different materials.

The transparent substrate is made of glass, polycarbonate (PC), polyester (PET), poly-methyl methacrylate (PMMA), Cyclo-Olefin Copolymers (COC), or other material such as any soft, hard, transparent, or semi-transparent material.

There are a pair of positioning indications which are installed on the upper and lower main surface of the substrate; and the positioning indications are positioned along a same line vertical to the upper or lower main surface of the substrate.

The plurality of positioning indications are far away from each other.

DETAILED DESCRIPTION OF THE PREFERRED EMBODIMENTS

In order that those skilled in the art can further understand the present invention, a description will be provided in the following in details. In the present invention, a transparent thin film us used as an embodiment, however, these descriptions and the appended drawings are only used to cause those skilled in the art to understand the objects, features, and characteristics of the present invention, but not to be used to confine the scope and spirit of the present invention defined in the appended claims. For example, resistive or electromagnetic touch panels are also suitable to the present invention.

Figure 1:
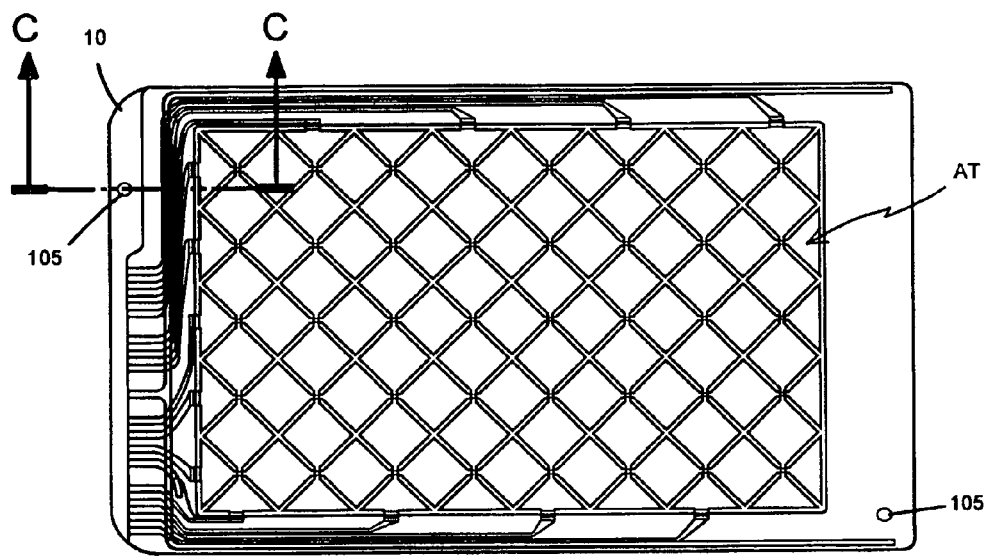
FIG. 1 is a plan view of the transparent substrate of the first embodiment of the present invention.
Figure 2:
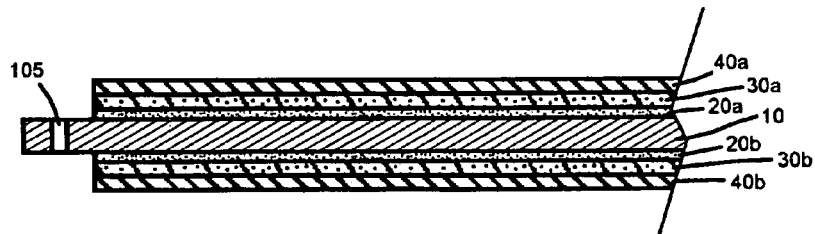
FIG. 2 is a schematic cross section view along the line C-C of FIG. 1.

Referring to FIGS. 1 and 2, the first embodiment of a touch panel assembly according to the present invention has a transparent substrate 10. An upper sensing electrode layer 20a, upper signal conducting layer 30a, and an upper protection layer 40a are formed upon an upper surface of the substrate 10 in order. A lower sensing electrode layer 20b, lower signal conducting layer 30b, and a lower protection layer 40b are formed to a lower surface of the substrate 10 in order. The transparent substrate 10 is made of glass, polycarbonate, polyester, polymethyl methacrylate, Cyclo-Olefin Copolymers, or other material such as any soft, hard, transparent, or semi-transparent material. The upper and lower sensing electrode layers 20a and 20b are Indium Tin Oxide or Indium-Zinc Oxide films. X axis sensing traces and Y axis sensing traces are formed to the upper and lower sensing electrode layers respectively. The upper and lower signal conducting layer 30a, 30b are signal conducting wires of Mo/Al/Mo or Ag/Pu/Cu coating formed by photo process. The signal conducting wires of the signal conducting layers 30a and 30b are connected to the sensing electrode layers. The upper and lower protection layers 40a, 40b are made of Silicon Nitride, Silicon Dioxide, photoresist, or a solidified material such as UV optical adhesive, or transparent thin plate of glass, polycarbonate, or polyester. The upper protection layers 40a is formed above the upper sensing electrode layers 20a and the upper signal conducting layer 30a so as to protect the layers from being damaged, and the lower protection layers 40b is formed above the sensing electrode layers 20b and the signal conducting layer 30b so as to protect the layers from being damaged.

It should be noted, in above manufacturing process, the substrate 10 is formed with two holes 105 which penetrate the panel and vertical to the upper or lower surface of the substrate. The holes 105 are formed on an area out of the touch sensing area AT of the touch panel. By the holes 105, the coordinate on the upper or lower surfaces of the substrate are identical. The holes 105 can be used in positioning and alignment in each manufacturing process of the touch panel. It is better as the distance between the two holes 105 is farther so as to increase the precision in positioning. The number of holes 105 may be large than 2. More holes are helpful in positioning on the substrate. However, this will increment the cost in manufacturing and reduce the strength of the substrate. Thus, the number of holes on the substrate is based on the workpieces in the manufacturing process. By the holes 105 in the substrate to as base on alignment, all layers on the upper and lower surface of the substrate can be positioned precisely in various manufacturing process so that the upper and lower sensing electrode layers are positioned precisely. The yield rate is increased and the optical properties of the panels are improved.

Figure 4:
FIG. 4 is a schematic cross section view along the line D-D of FIG. 2.
Figure 3:
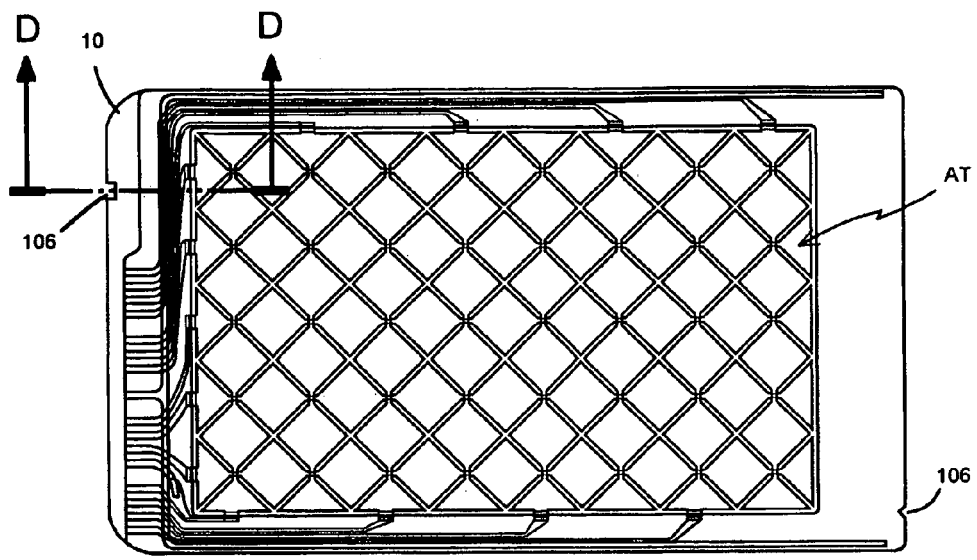
FIG. 3 is a plan view of the transparent substrate of the second embodiment of the present invention.
Figure 5:
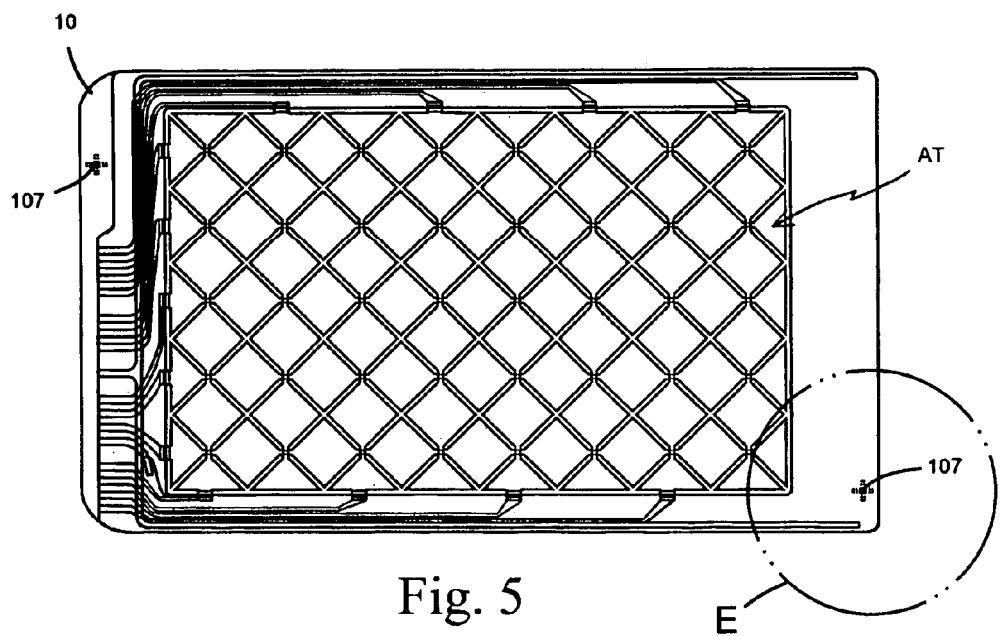
FIG. 5 is a plan view of the transparent substrate of the third embodiment of the present invention.
Figure 6:
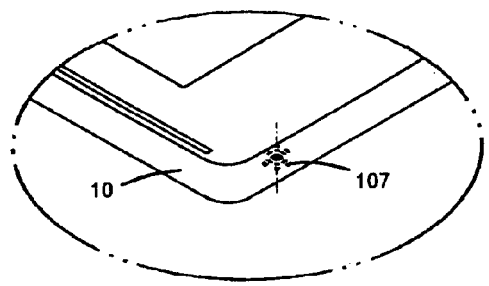
FIG. 6 is a schematic perspective view for E portion of FIG. 5.
Figure 7:
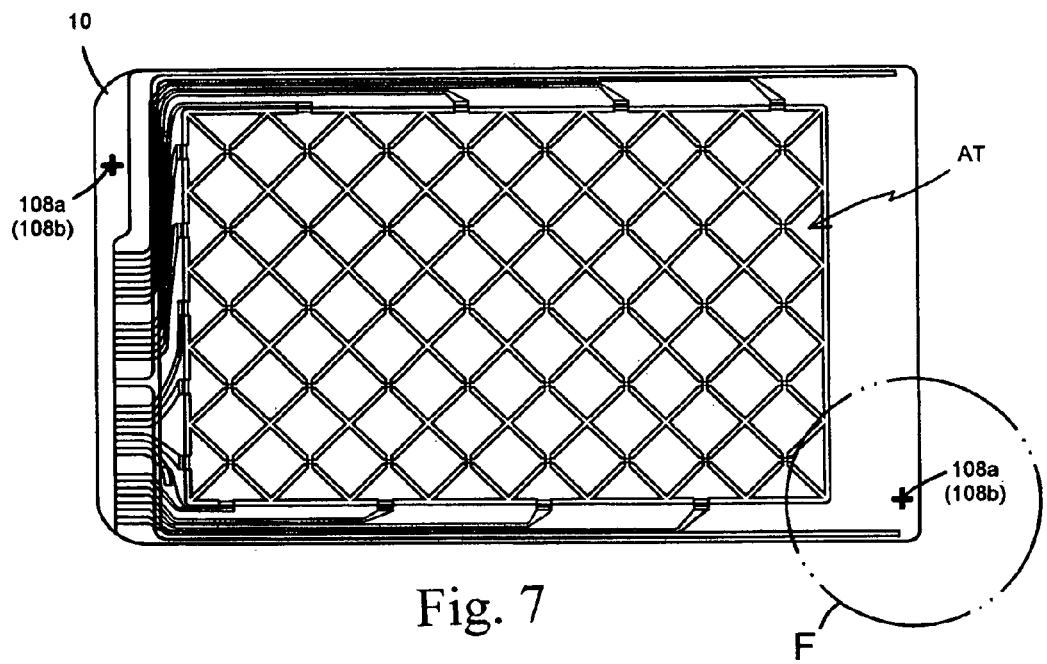
FIG. 7 is a plan view of the transparent substrate of the fourth embodiment of the present invention.
Figure 8:
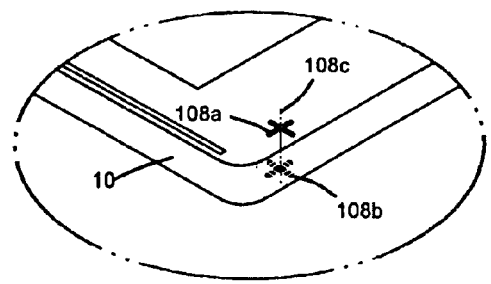
FIG. 8 is a schematic perspective view for F portion of FIG. 6.

Above design can be extended. The hole 105 can be replaced by a plurality of gaps 106 at the edge of the substrate 10 and is vertical to the upper or lower main surface of the substrate (referring to FIGS. 3 and 4). Or a positioning indication 107 (referring to FIGS. 5 and 6) on the substrate 10 by the engraving of laser can be used to replaced the hole 105. Or a pair of positioning indications 108a and 108b on the upper and lower main surface of the substrate 10 are used to replace the hole 106, while the positioning indications are positioned along a same line 108c (referring to FIGS. 7 and 8) vertical to the upper or lower main surface of the substrate.

Figure 9:
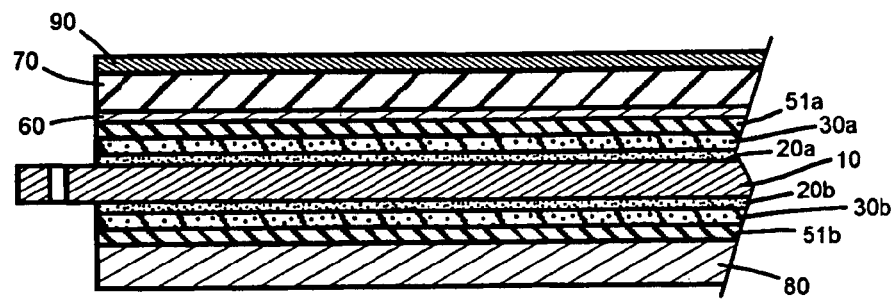
FIG. 9 is a schematic cross section view about the assembly of the fifth embodiment of the present invention.

Based on the structure in the first embodiment of the present invention and the use of the touch panel, the structure is adjustable. For example, in the fifth embodiment illustrated in FIG. 9 of the present invention having the same components as the first embodiment further includes a gluing layer 51a covering over the signal conducting layer 30a for attaching a color frame 60 (I-Con), a cover lens 70 and a functional film 90. A lower surface of the lower signal transmission layer 30b is covered by an adhesive layer 51b for adhering by a liquid crystal module (LCM) 80. The color frame 60 formed to a bottom edge of the cover lens 70 is made of ink, color photo resistance, organic material, or inorganic material by means of printing, coating, or metal evaporation coating. The material and method are not limited to those which are mentioned above. The color frame 60 will cover the upper and lower signal conducting layers so as to have a better appearance. Besides, the function film 90 is an anti-finger print layer, an atomizing film or a hard coating film so as to prevent from pollution and reduce the light reflection or improve the hardness or have a high crack prevent ability. The function film 90 is a film with a function of light adjustment such as a light polarization film, a phase difference film, a photo omni-directional film or other photo films.

Figure 10:
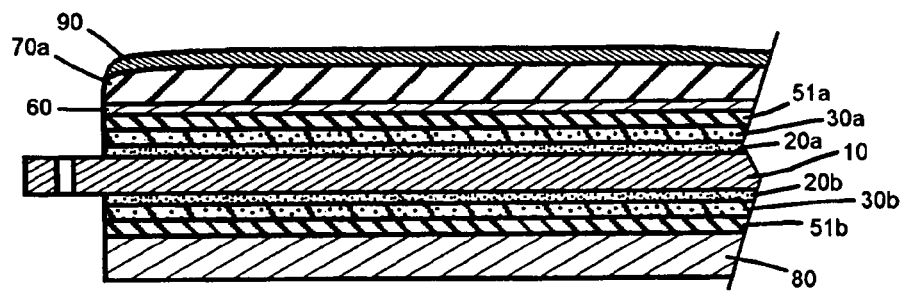
FIG. 10 is a schematic cross section view about the assembly of the sixth embodiment of the present invention.

Referring to FIG. 10, the sixth embodiment of the present invention is illustrated. In this embodiment, the cover lens 70 is replaced by a convex lens 70a. However, other concave, regular or irregular lenses are permissible in the present invention.

Figure 11:
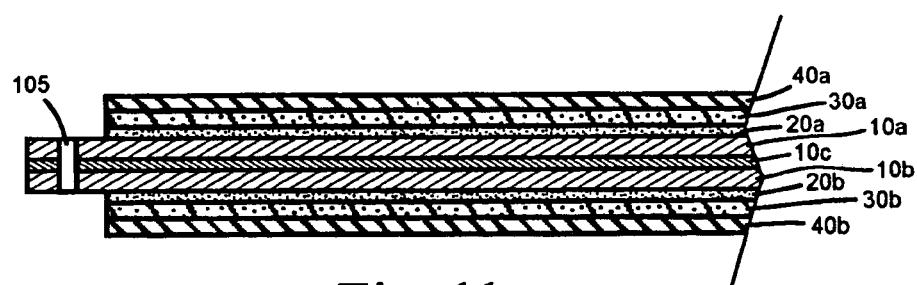
FIG. 11 is a schematic cross section view about the assembly of another element in the first embodiment of the present invention.
Figure 12:
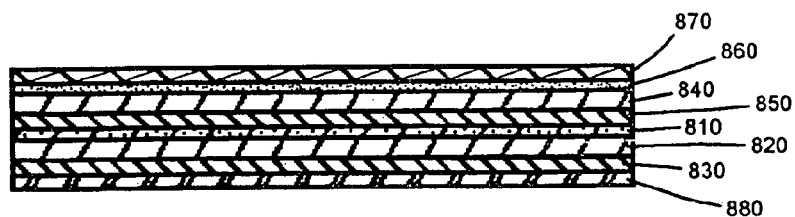
FIG. 12 is a schematic view about the prior art touch panel.
Figure 13:
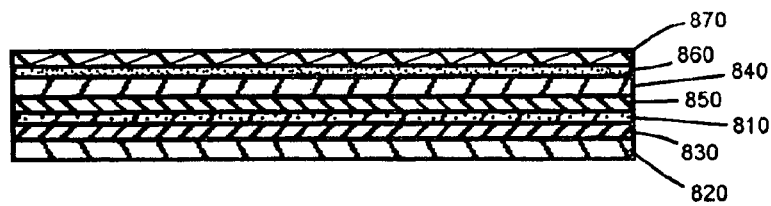
FIG. 13 is a schematic cross section view about the assembly of the prior art touch panel.

The present invention is thus described, it will be obvious that the same may be varied in many ways. For example, the transparent substrate 10 could be replaced by stacking plates of a plurality of thin films, such as it contains transparent substrate 10a and 10b glued by a gluing layer 10c as shown in FIG. 11. The transparent plates 10a and 10b can be made of the same or different material. Such variations having equivalent function with the above embodiments are not to be regarded as a departure from the spirit and scope of the present invention, and all such modifications as would be obvious to one skilled in the art are intended to be included within the scope of the following claims.

What is claimed is:

1. A substrate of a touch panel in manufacturing process, an upper sensing electrode layer, an upper signal conducting layer, and an upper protection layer being formed upon an upper surface of the substrate in order; a lower sensing electrode layer, a lower signal conducting layer, and a lower protection layer being formed to a lower surface of the substrate in order; X axis sensing traces and Y axis sensing traces being formed to the upper and lower sensing electrode layers respectively; the signal conducting wires of the signal conducting layers being connected to the sensing electrode layers; the upper protection layers being formed above the upper sensing electrode layers and the upper signal conducting layer so as to protect the layers from being damaged, and the lower protection layers being formed above the sensing electrode layers and the signal conducting layer so as to protect the layers from being damaged; the substrate comprises:

a plurality of identical positioning indications which cause that coordinates on the upper or lower surfaces of the substrate are identical; the identical positioning indications being selected from one of a plurality of holes formed on an area out of the touch sensing area of the touch panel; a plurality of gaps formed at edges of the substrate and vertical to an upper or a lower main surface of the substrate; positioning indications being formed by engraving of laser; and a pair of positioning indications on the upper or lower main surface of the substrate being positioned along a same line vertical to the upper or lower main surface of the substrate; and a combination of above mentioned ways; and after manufacturing process, the positioning indications can be removed or not removed.

2. The substrate of claim 1, where the substrate is a transparent thin film or multiple layers of transparent thin films which are glued together.

3. The substrate of claim 2, wherein the plurality of thin films are formed of identical or different materials.

4. The substrate of claim 2, wherein the transparent substrate is made of glass, polycarbonate (PC), polyester(PET), polymethyl methacrylate (PMMA), Cyclo-Olefin Copolymers (COC), or other soft, hard, transparent, or semi-transparent material.

5. The substrate of claim 1, wherein the plurality of positioning indications are far away from each other.

6. The substrate of claim 2, wherein the plurality of positioning indications are far away from each other.

7. A method for manufacturing h substrate of a touch panel, wherein an upper sensing electrode layer, an upper signal conducting layer, and an upper protection layer being formed upon an upper surface of the substrate in order; a lower sensing electrode layer, a lower signal conducting layer, and a lower protection layer being formed to a lower surface of the substrate in order; X axis sensing traces and Y axis sensing traces being formed to the upper and lower sensing electrode layers respectively; the signal conducting wires of the signal conducting layers being connected to the sensing electrode layers; the upper protection layers being formed above the upper sensing electrode layers and the upper signal conducting layer so as to protect the layers from being damaged, and the lower protection layers being formed above the sensing electrode layers and the signal conducting layer so as to protect the layers from being damaged; comprising the steps of:

in manufacturing process, the substrate being formed with a plurality of identical positioning indications which cause that coordinates on an upper or a lower surface of the substrate are identical; the identical positioning indications are selected from one of a plurality of holes formed on an area out of the touch sensing area of the touch panel; a plurality of gaps being formed at edges of the substrate and being vertical to the upper or lower main surface of the substrate; positioning indications formed by engraving of laser; and a pair of positioning indications on the upper and lower main surface of the substrate being positioned along a same line vertical to the upper or lower main surface of the substrate; and a combination of above mentioned ways; and after manufacturing process, the positioning indications being removed or not removed.

8. The method of claim 7, where the substrate is a transparent thin film or multiple layers of transparent thin films which are glued together.

9. The method of claim 8, wherein the plurality of thin films are formed of identical or different materials.

10. The method of claim 8, wherein the transparent substrate is made of glass, polycarbonate (PC), polyester(PET), polymethyl methacrylate (PMMA), Cyclo-Olefin Copolymers (COC), or other soft, hard, transparent, or semi-transparent material.

11. The method of claim 7, wherein the plurality of positioning indications are far away from each other.

12. The method of claim 8, wherein the plurality of positioning indications are far away from each other.

* * * * *